Oct. 5, 1965　　　　A. P. WIERZBICKI　　　3,210,626
ELECTRICAL CONTROLLER WITH POSITIVE AND
NEGATIVE FEEDBACK FOR SERVOMOTOR
Filed Aug. 3, 1962　　　　　　　　　　　　4 Sheets-Sheet 1

United States Patent Office 3,210,626
Patented Oct. 5, 1965

3,210,626
ELECTRICAL CONTROLLER WITH POSITIVE AND NEGATIVE FEEDBACK FOR SERVOMOTOR
Andrzej Piotr Wierzbicki, Warsaw, Poland, assignor to Hartmann & Braun Aktiengesellschaft, Frankfurt am Main, Germany, a corporation of Germany
Filed Aug. 3, 1962, Ser. No. 214,681
Claims priority, application Germany, Aug. 9, 1961, H 43,365
6 Claims. (Cl. 318—18)

The invention relates to improvements of a known step-by-step controller consisting of a relay having three switching positions, a motor and a negative feedback channel, both being switched off or on in one or the other sense, i.e., three switching positions in accordance with input signals of the relay the values of which are zero, positive or negative. Such controllers are found in Patent No. 2,859,397. The feedback channel has a time delay characteristic, i.e., the signal which is transmitted by the channel to the relay input tends to increase to its end value at a decreasing rate. This signal counteracts the input value by the degenerating action of the feedback channel. In this way the relay produces impulses feeding the servomotor. The servomotor integrates the single increments which the rotor of the servomotor covers under the influence of the single impulses. Timing circuits as shown in Patent Nos. 2,396,898 and 2,860,298. The length of the first impulse delivered by the relay is proportional to the magnitude of the input value. Therefore at first the distance covered by the running motor is proportional to the magnitude of the input value. The motor integrates the following impulses each of which has a considerably smaller duration than that of the first impulse. In this manner the controller has a time function similar to proportional-integral action.

The object of the invention is to improve the aforementioned step-by-step controller to obtain new and advantageous properties. The invention especially tends to change the aforementioned structure of the step-by-step controller so as to obtain a characteristic like proportional-integral-differential action. As further shown the frequency of the switching impulses of the relay can be reduced considerably.

Below the principle of a step-by-step controller according to the invention is compared with that of the known controller in order to emphasize the technical progress achieved with the subject matter of the invention.

Figure 1:
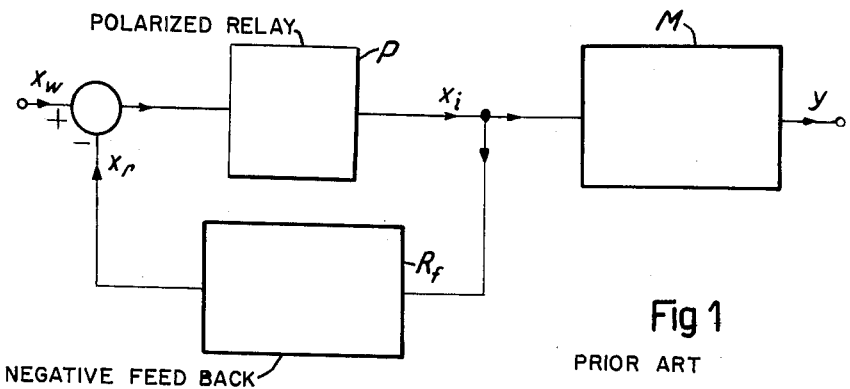

The block diagram of FIG. 1 shows the well known step-by-step controller containing a three-point relay actuating servomotor M and feedback means $R_f$ for generating a feedback value which increases with time delay and counteracts the input value. The three-point relay P has, for example, two exciting coils and an armature which remains in zero position if the input value of the relay is zero and which is attracted by one or the other exciting field depending on the fact whether the positive or negative input value of sufficient quantity energizes one or the other relay coil. According to the polarity or the input value the servomotor M is switched on for running clockwise or anticlockwise, thereby adjusting the regulating device. Simultaneously feedback means are switched on, thereby producing a feedback signal of such direction that it counteracts the input signal. Particularly the relay armature is attracted when the exciting current of the relay coils increases above the value $x_e$ and the relay armature is released if the exciting current decreases below the smaller value $x_a$. Instead of a single relay an arrangement of several relays may be used each having, for instance, an exciting coil and an armature which co-operate together to obtain the aforementioned effect. The feedback channel has an exponential characteristic, i.e., if feedback means are switched on, the feedback signal gradually increases and tends to reach its end value with time delay. If, on the other hand, the feedback channel is switched off the feedback signal begins to gradually decrease and tends to reach its end value also with time delay. The feedback channel may consist, for instance, of capacitor-resistance elements whose charging or discharging operation may be used to derivate the feedback signal.

Figure 5:
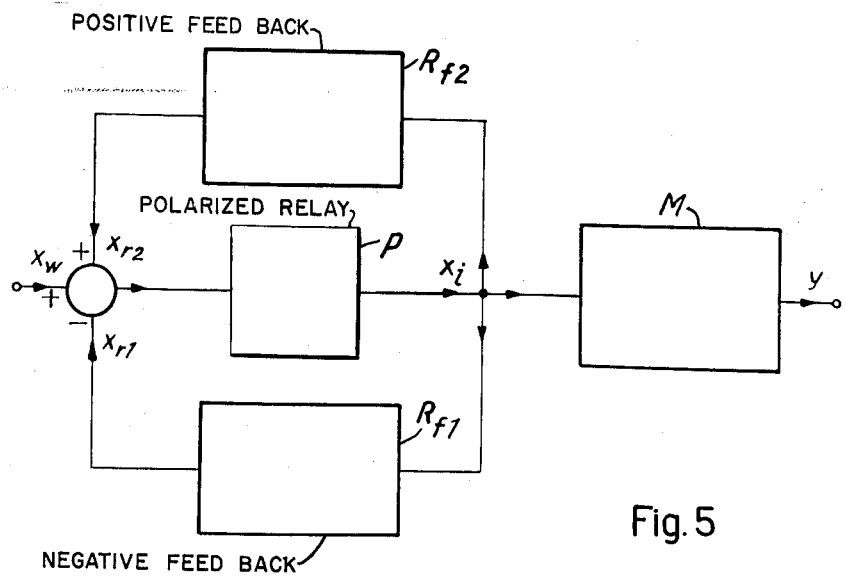
Figure 2:
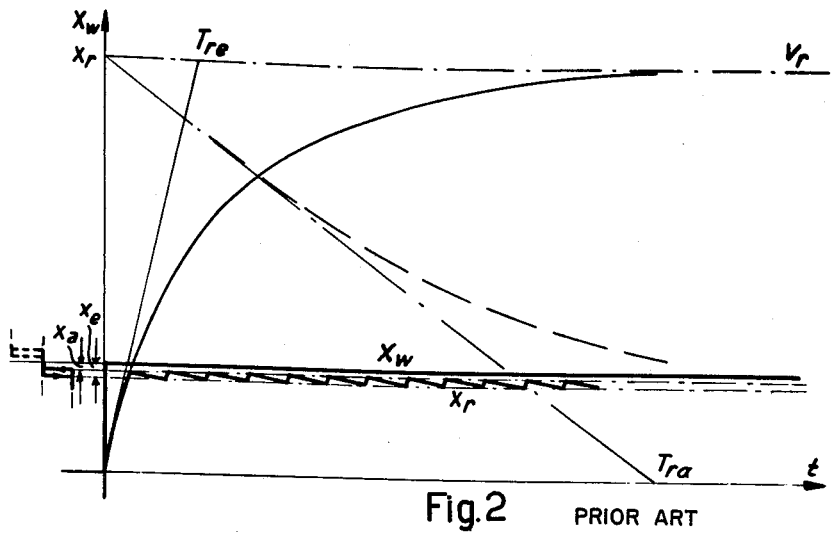
Figure 3:
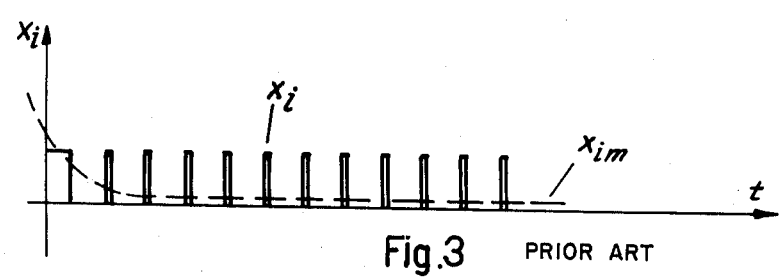
Figure 4:
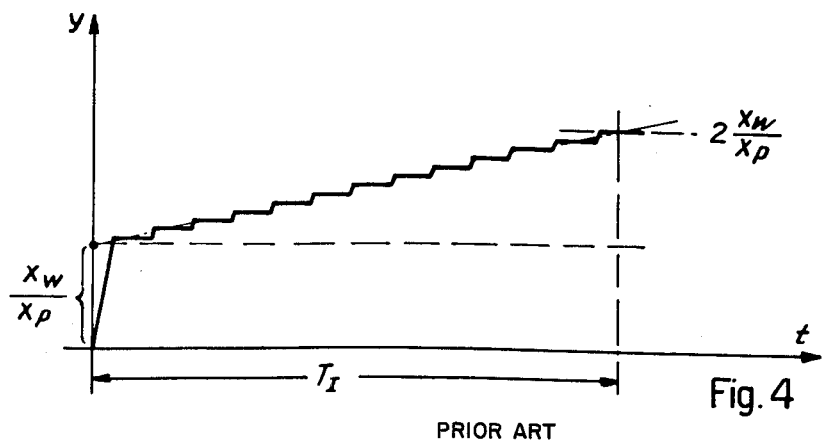
Figure 6:
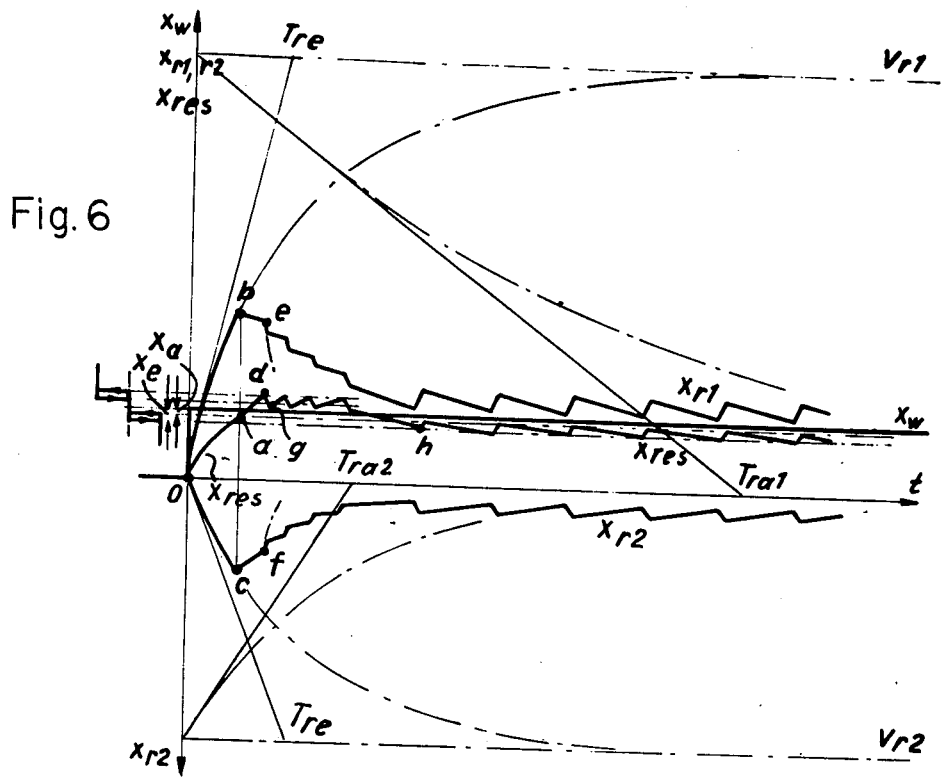
Figure 7:
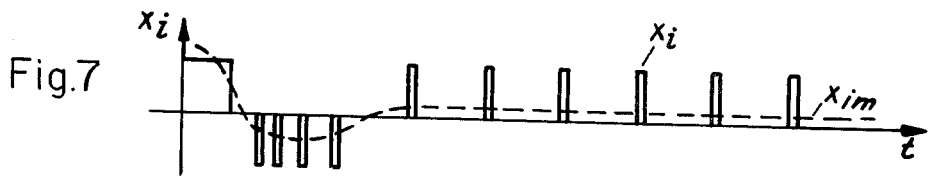
Figure 8:
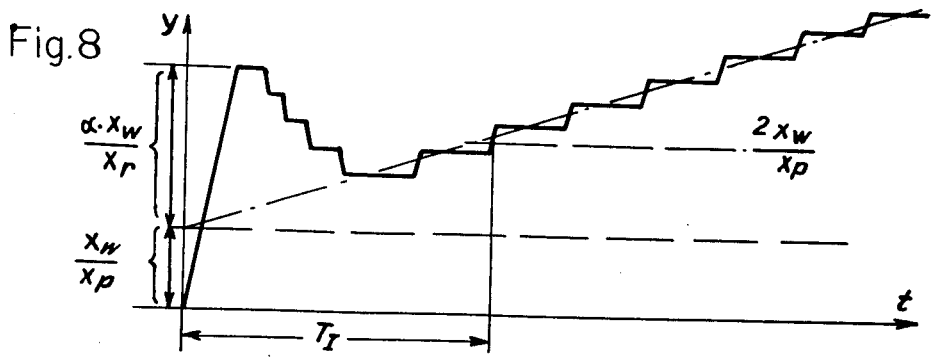
Figure 9:
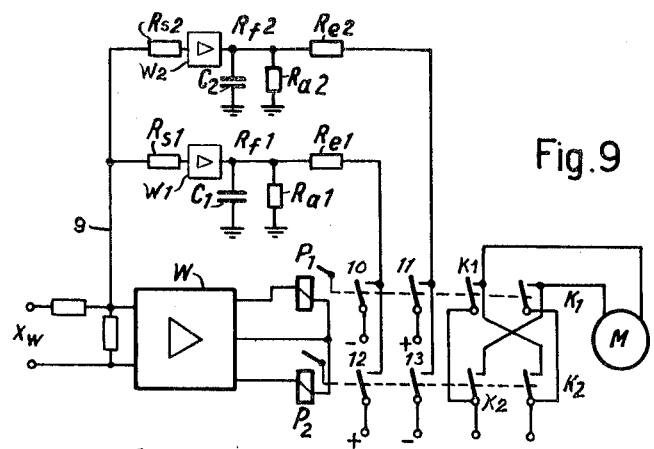
Figure 10:
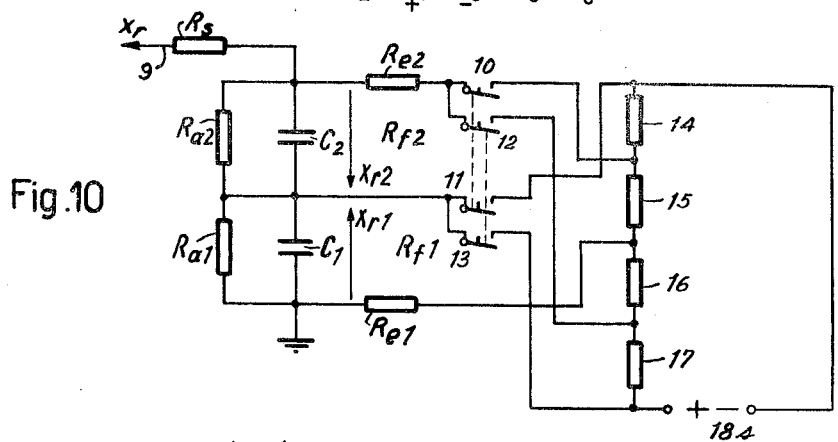
Figure 11:
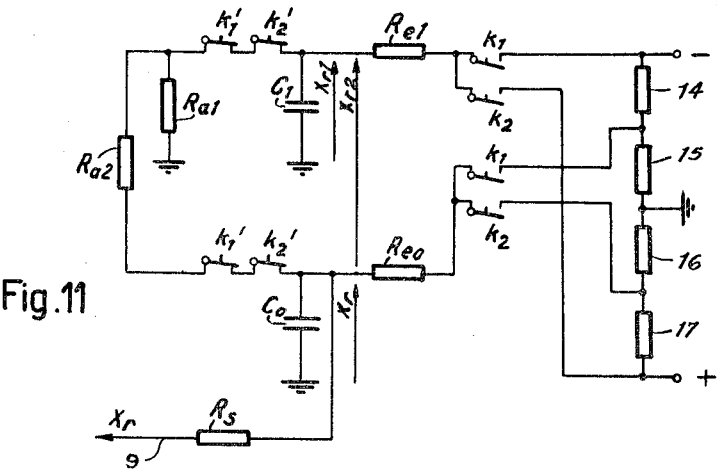

FIG. 1 schematically shows known negative feedback to a positive-zero-negative relay controlling a servomotor.
FIGS. 2, 3 and 4 show known characteristic operating curves or diagrams for the device of FIG. 1.
FIG. 5 shows the invention as a simplified schematic controller for a servomotor having a new combination of positive and negative feedback.
FIGS. 6, 7 and 8 show characteristic operation curves for the invention as shown in FIG. 5.
FIG. 9 shows circuitry for positive and negative feedback in connection with an amplifier relay system and a servomotor.
FIG. 10 shows positive and negative circuitry similar to that of FIG. 9, but with feedback switches being the only parts of the amplifier and relay system shown, and
FIG. 11 shows circuitry generally similar to that of FIG. 10.

Assuming, for instance, an input signal $x_w$ of positive direction suddenly exceeds the current value $x_e$ of the relay in FIG. 2, the relay is energized and actuates the motor as well as the feedback channel $R_f$. In this way the feedback value $x_r$ exponentially increases with time constant $T_{re}$. As the feedback value $x_r$ counteracts the input signal $x_w$ the relay releases as soon as the difference $x_w - x_r$ becomes smaller than the release value $x_a$ of the relay and the servomotor and the feedback channel are switched off. Thereupon the feedback value $x_r$ gradually decreases with time constant $T_{ra}$ until the difference $x_w - x_r$ exceeds the value $x_e$ of the relay. Hereafter the relay again switches in the servomotor. This cycle of switching on and off is repeated as long as an input signal exists at the relay input. In this way the time characteristic of the feedback value shown in FIG. 2 is obtained resulting in a series of current impulses $x_i$ with dash-lined mean value $x_{im}$ shown in FIG. 3.

The first impulse is longer than the following ones. The mean value $x_{im}$ has a proportional-differential time function. Servomotor M is integrating the impulses and consequently a deflection $y$ of the positioning element is obtained as shown in FIG. 4. This function is similar to that of a proportional-integral controller. The first rise corresponds to the proportional rate and determines the value of the input signal $x_w$ referred to the proportional band $x_p$, whereas the following stepwise characteristic represents in approximation the I-rate with reset value $T_I$. Adjustment of the proportional band $x_p$ and the reset value $T_I$ of this controller is achieved by varying the increase time constant $T_{re}$, the decrease time constant $T_{ra}$ and the degree of amplification $V_r$ of the feedback.

The following approximated equations will be obtained for the frequency response $F_R$, the proportional band $x_p$ and the reset rate $T_I$ of the known controller:

$$F_R(j\omega) = \frac{1}{x_p}\left(1 + \frac{1}{T_I j\omega}\right)$$

$$x_p \approx \frac{V_r T_h}{T_{re}}$$

$$T_I \approx T_{ra}$$

$T_h$ being the running period of the motor.
FIG. 5 shows the diagram of the operation of a controller according to the invention. The output of the three-point relay P may be coupled to the relay input not only by a negative feedback channel $R_{f1}$, but also by a positive feedback channel $R_{f2}$, both feedback channels having time delay characteristics. The time constant during the decrease of the positive feedback signal is considerably smaller than the time constant during the decrease of the negative feedback signal. Contrary hereto the time constants during the increase of both feedback signals have been assumed as being equal, i.e., $T_{re1}=T_{re2}=T_{re}$. The degree of amplification $V_{r2}$ of the positive feedback is smaller than the degree of amplification $V_{r1}$ of the negative feedback, the resultant effect of the two feedbacks therefore always being negative.

The operating principle of the controller is explained by its time function. FIGS. 6, 7 and 8 show the time function of feedback values $x_{r1}$ and $x_{r2}$ of the resultant feedback signals $X_{res}=x_{r1}-x_{r2}$, of the impulses $x_i$ of the relay and the output value $y$ of the controller after a jerk of input signal $x_w$.

Abrupt changes of the input signal $x_w$ cause attraction of the relay armature. The two feedback values $x_{r1}$, $x_{r2}$ increase from zero position proportional to their degree of amplification and with equal time constants $T_{re}$ (see FIG. 6). This figure furthermore shows the characteristics of the difference between these two feedback values, i.e., the resultant feedback value $x_{res}$. These feedback values increase until at point $a$ of the curve of the resultant feedback value, the difference $x_w-x_{res}$ of the input signal and the resulting feedback value drop below the release value, $x_a$ of the relay, thus causing release of the relay armature. At this moment the feedback values $x_{r1}$, $x_{r2}$ have reached their maximum values $b$ and $c$. The first switching impulse, $x_i$ produced by the relay (FIG. 7) is longer than that of a proportional-integral step-by-step controller with the same degree of amplification and the same time constant during increase of the negative feedback signal because in the controller of the invention the feedback value $x_{r1}$ is weakened by feedback value $x_{r2}$. These two feedback values gradually decrease from $b$ to $e$ and from $c$ to $f$ after the first switching off by the relay. In case of a sufficient degree of amplification $V_{r2}$ of the positive feedback the larger decrease time constant $T_{ra1}$ becomes effective with respect to the smaller decrease time constant $T_{ra2}$ in such a manner that the decrease rate of the negative feedback will be smaller than the decrease rate of the positive feedback. Consequently the values of the positive feedback $x_{r2}$ decrease more rapidly from point $c$ than the values of the negative feedback $x_{r1}$ from point $b$. The resultant feedback value $x_{res}$ therefore increases further and causes at point $d$ switching in by the relay armature in opposite directions.

Therefore signals with reversed polarity are applied to the two feedbacks $R_{f1}$ and $R_{f2}$ by the relay. The increase of the two feedback values $x_{r1}$ and $x_{r2}$ therefore is effective in reverse direction from point $e$ and point $f$ corresponding to point $d$ of the characteristics of the resultant feedback value $x_{res}$ so that all feedback values decrease until switching off by the relay armature is achieved at point $g$ of the characteristic $x_{res}$. Hereafter due to the different decrease velocities of the positive and negative feedback the resultant feedback value increases again until the relay armature is again attracted at $d_1$. Attraction and release of the relay armature in the negative direction is repeated until the positive feedback and consequently its decrease rate has become very small. The decrease rate of the negative feedback then becomes larger than the decrease rate of the positive feedback. Consequently the resultant feedback value decreases when the relay armature switches off and at point $h$ of the characteristic returns to its first switching direction. Following the above described effect of the feedbacks the relay supplied the series of impulses shown in FIG. 7 having dash-lined mean value $x_{im}$. The servomotor integrates this series of impulses so that the controller function shown in FIG. 8 will be obtained. It differs from that of FIG. 4 by the initial excess rise which supplements the proportional-integral-function in relation to the proportional-integral-derivative-function. The maximum amplitude of the first rise corresponds to the sum of the proportional-rate and derivative-rate that means $$\frac{x_w}{x_p}+\alpha\cdot\frac{x_w}{x_p}$$

being the rate amplifying factor.

Considering the non-linearity of the various components of the controller the following equations will be found for the proportional-integral-derivative step-by-step controller in case of frequency response $F_R$, proportional band $x_p$, reset rate $I_T$, rate time $T_D$ and rate amplification:

$$F_R(j\omega)=\frac{1}{x_p}\left(1+\frac{T_D j\omega}{\frac{T_D}{\alpha}j\omega+1}+\frac{1}{T_I j\omega}\right)$$

$$x_p \approx \frac{T_h V_{r1}}{T_{re}}$$

$$T_I \approx T_{ra1}$$

$$T_D \approx T_{ra2}\frac{1}{1-\frac{T_{ra2}}{T_{ra1}}}\cdot\frac{V_{r2}}{V_{r1}}$$

$$\alpha \approx \frac{V_{r2}}{V_{r1}-V_{r2}}$$

When comparing these equations obtained for the step-by-step controller of the invention with those given for the known proportional-integral-controller it will be noticed that the equations for the proportional band and the reset rate are practically based on the same values. This means that the derivative rate in first approximation does not influence the proportional and integral rates.

The PID invention has the following advantages:

It is generally better than either the step-by-step or steady proportional-integral controllers. Furthermore its added or derivative action is such that it permits use of a three state relay which is relatively cheap. Also switching frequency is reduced because of longer "off" periods due to the negative feedback having to overcome positive feedback.

FIG. 9 shows an example of a step-by-step controller operable according to FIGS. 6, 7 and 8 with electric RC-networks in the feedback channels. The controller comprises amplifier W, two relays $P_1$, $P_2$ at the output and energized depending on the sign of the input voltage of the amplifier, servomotor M and two feedback channels $R_{f1}$, $R_{f2}$ designed as RC-networks working parallel with respect to the amplifier input. The relays $P_1$ and $P_2$ are in fact no different from a polarized or two-way relay having a stable "off" position. With positive input voltage of the amplifier the relay $P_1$ will be energized and the contacts $K_1$ switch in the servomotor to forward travel. Simultaneously additional switches 10 and 11 of this relay connect a negative voltage to network $R_{f1}$ which counteracts the input signal and applies a positive voltage to network $R_{f2}$ acting in the same sense as the input signal. Inversely, in case of negative input voltage of the amplifier the relay $P_2$ is energized which on the one hand reverses the servomotor to backward travel by closing switches $K_2$ and on the other applies D.C. voltage with reverse polarity to the two networks by closure of switches 12 and 13. The amplitudes of these voltages are determined by gains $V_{r1}$ and $V_{r2}$ of amplifiers $W_1$ and $W_2$ in their corresponding networks. The increase and decrease time constants can be adjusted in the feedbacks by capacitors $C_1$, $C_2$ and the charging and discharge resistors $R_{e1}$, $R_{e2}$ and $R_{a1}$, $R_{a2}$. The additionally provided resistors $R_{s1}$, $R_{s2}$ serve for summation of the feedback values for the conductor $r$ to the input of the amplifier.

The above example relates to a construction where the resultant feedback value is traced back to the difference of the currents supplied by the networks, however FIG. 10 shows an example where the resultant feedback values are obtained as difference of two voltage values supplied by the feedbacks. Switches 10 and 11 are assumed ganged to each other and to the relay means and motor switch as in FIG. 9. The designation of the switching elements have been chosen in compliance with the previous example.

Since the conductor 9 applies only a resultant or algebraic sum of potentials to the amplifier the designation of plus and minus sources in FIG. 9 is somewhat arbitrary. The differences can be obtained from taps on serially connected resistors 14, 15, 16 and 17 fed by a common source 18s. With only switches 10 and 11 closed negative current in network $R_{f2}$ must pass through resistors 15, 16 and 17 and in network $R_{f1}$ through only 16 and 17. With only switches 12 and 13 closed, network $R_{f2}$ includes resistors 14, 15 and 16, while $R_{f1}$ only resistors 14 and 15. The polarities have been reversed but the voltages for each network have remained the same.

Furthermore there are always three resistors in series with the common source 18s and channel $R_{f2}$ and only two resistors for channel $R_{f1}$.

Since amplification from channel $R_{f2}$ is to be less than that from channel $R_{f1}$, the increased resistance in the supply source tends to offset any need for actual amplifiers, and they may be eliminated by proper choice of RC values.

Here the feedback values $x_{r1}$ and $x_{r2}$ occur as voltage values at capacitors $C_1$ and $C_2$ connected in series, the voltage difference being fed to the relay input through resistance $R_s$. The effectiveness of this diagram does not need further details of description.

Both feedbacks can also be combined to a meshed network reproducing the desired time characteristic of the resulting feedback value without producing negative and positive feedbacks in separate channels. The example of such a network is shown in FIG. 11.

When switching in the relay, the capacitor $C_0$ is fed by a partial voltage and capacitor $C_1$ by the total available voltage through contacts $K_1$ respectively $K_2$. This results in charging of capacitor $C_0$ through the inherent load resistance $R_{e0}$ and capacitor $C_1$ through inherent load resistance $R_{e1}$. Charging time constants of equal value have been chosen for both capacitors.

The relay being switched in there is only the voltage at capacitor $C_0$ effective as feedback value $x_r$ across resistance $R_s$, whereas the voltage of capacitor $C_1$ is separated across the open spacing contact $K_1$. The height of the charging voltage for capacitor $C_0$ has been chosen in such a manner that the characteristic of the voltage at the capacitor corresponds to that of the resulting feedback value $x_{res}$ shown in FIG. 6. However due to the higher charging voltage the characteristic of the voltage at capacitor $C_1$ corresponds to that of the negative delayed feedback $x_{r1}$ also shown in FIG. 6. The difference of the charging voltages of both capacitors $C_0$ and $C_1$ can therefore be considered as characteristic of the positive delayed feedback $x_{r2}$ as shown in FIG. 6. If the relay is switched off, i.e., if spacing contacts $K_1'$ and $K_2'$ are closed, the aforementioned two capacitors are connected by resistance $R_{a2}$. Simultaneously at capacitor $C_1$ a discharge resistance $R_{a1}$ is connected by the above spacing contacts, the value of this resistance being considerably higher than that of resistance $R_{a2}$. The different values of the discharge voltages at capacitors $C_0$ and $C_1$ equalize each other quickly across the relatively low resistance $R_{a2}$, which causes a temporary voltage increase at capacitor $C_0$. Hereafter both capacitors are discharged by resistance $R_{a1}$. The transient voltage increase at capacitor $C_0$ corresponds to the further increase of the resultant feedback value $x_{res}$ as shown in FIG. 6 and therefore represents the D-like behaviour of the whole controller.

Consequently there exists a maximum analogy between the functioning of this meshed circuit and the functioning of the above explained constructions with two counteracting feedback values, because—as already mentioned—according to FIG. 11 the voltage at capacitor $C_1$ can be considered as negative feedback $x_{r1}$, the voltage at capacitor $C_0$ as resultant feedback $x_{res}$ and the difference between both voltages as positive feedback $x_{r2}$. There is also an analogy inasmuch as the voltage of capacitor $C_1$ decreases slowlier as a function of feedback value $x_{r1}$, whereas the difference of the voltages at capacitors $C_1$ and $C_0$ decreases quicklier corresponding to the feedback value $x_{r2}$. This process is decisive for the PID-action as proved already by the explanations on the basic principle of the controller.

I claim:

1. A control system comprising a motor, a relay system controlling the motor as a function of the values zero, positive and negative of the input signals to the relay, two feedback timing networks, one delivering a feedback signal supporting the input signal to the relay system, the other one delivering a feedback signal counteracting the input values of the relay system, the second named network having a greater amplification factor than the first named network, a voltage source for the motor and another voltage source for the networks, and a switching device actuated by the relay system for connecting the motor and the networks to their respective voltage sources to feed the motor and the networks in one or the other direction with respect to the polarity of the input signals and for disconnecting the motor and the networks from their respective voltage sources when the input signals are zero, the timing networks having a time delay characteristic for delaying the increase of the feedback signals when the networks are connected to their voltage source and for delaying the decrease of the feedback signals when the networks are disconnected from their voltage source, thereby producing during the individual switching-in periods periodical current impulses for driving the motor stepwise.

2. A control for a reversible motor comprising a source of motive current for the motor, a first, second and third state motor switch for selectively connecting the motive current to the motor for forward, reverse and no motion of the motor respectively, an electrical relay device having first, second and third stable conditions, the state of the motor switch corresponding to the condition of the relay, the third condition corresponding to zero input and the first and second according to the polarity of the input to the relay device, first and second feedback systems operative in parallel and in opposite senses and for response to the condition of the relay device and for influencing the relay device input, means for activating both feedback systems with substantially equal time delay and to different degrees when the relay device assumes one of the first two conditions, the first system being activated to the greater degree so that the motor will turn without immediate effect of either feedback system, first and second deactivating means for the first and second systems, respectively, for at least partial deactivation of the activated systems when the relay device assumes the third condition, the second deactivating means being for deactivating the second system faster than the first deactivating means acts on the first system, whereby the resultant of activation degrees and difference of rates of deactivation will be an increasing value during deactivation when the first system is sufficiently activated, and means for reversing the senses of the two systems substantially simultaneously when the relay device passes from one of the first conditions to the other through the third, whereby when the degrees of activation become widely different in one sense so as to make a biasing input signal to the relay device equal to zero and establish the third condition, the deactivating means will cause an increasing resultant output from the system for reversing the polarity of the input to the relay device and reverse the motor and the senses of the feedback systems, during deactivation of the systems, for establishing a temporary reverse bias on the input to relay device.

3. A control as claimed in claim 2, each system containing a condenser, and each of said means for activating being a source of current of selective polarity for the condenser and a timing resistor interposed therebetween.

4. A control as claimed in claim 3, each of said means for deactivating the system being the combination of a discharge resistor across the respective condensers and a switch interposed between the source of current for the condenser and same and actuated by the relay device.

5. A control as claimed in claim 3, said means for reversing the senses of the systems being switches for selectively connecting the sources of current for the condensers thereto and actuated by the relay device.

6. A control as claimed in claim 3, the sources of current for activation being from a common source and a lesser resistance between the common source and the condenser of the first system and a greater resistance between the common source and the second condenser.

No references cited.

JOHN F. COUCH, *Primary Examiner.*